United States Patent
Hu et al.

(10) Patent No.: US 7,430,897 B2
(45) Date of Patent: Oct. 7, 2008

(54) METHOD AND APPARATUS FOR DETECTING AND LOCATING GAS LEAKS

(75) Inventors: Cheng Hu, Vancouver (CA); Xidong Qu, Burnaby (CA); Jonathan Q. M. Wu, Vancouver (CA); Kevin G. Stanley, Vancouver (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 10/528,239

(22) PCT Filed: Sep. 19, 2003

(86) PCT No.: PCT/CA03/01434

§ 371 (c)(1),
(2), (4) Date: Jan. 31, 2006

(87) PCT Pub. No.: WO2004/027369

PCT Pub. Date: Apr. 1, 2004

(65) Prior Publication Data

US 2006/0162428 A1 Jul. 27, 2006

Related U.S. Application Data

(60) Provisional application No. 60/411,786, filed on Sep. 19, 2002.

(51) Int. Cl.
*G01M 3/04* (2006.01)
(52) U.S. Cl. .......................... 73/49.2; 73/40
(58) Field of Classification Search ............ 73/40, 73/40.7, 49.2, 40.5 R, 49.1, 49.3
See application file for complete search history.

(56) References Cited

U.S. PATENT DOCUMENTS

| | | | | |
|---|---|---|---|---|
| 3,786,675 A | * | 1/1974 | Delatorre et al. | ........... 73/25.03 |
| 3,925,666 A | | 12/1975 | Allan et al. | |
| 5,214,412 A | * | 5/1993 | Gavlak et al. | ............... 340/632 |
| 5,279,795 A | | 1/1994 | Hughes et al. | |
| 5,301,538 A | | 4/1994 | Recla | |
| 5,440,916 A | * | 8/1995 | Stone et al. | ................ 73/23.31 |
| 5,979,239 A | | 11/1999 | Youngquist et al. | |
| 6,018,169 A | | 1/2000 | Tohyama | |
| 6,156,447 A | | 12/2000 | Bette et al. | |

(Continued)

FOREIGN PATENT DOCUMENTS

JP          05196534          8/1993

(Continued)

*Primary Examiner*—Daniel S Larkin
(74) *Attorney, Agent, or Firm*—Oyen Wiggs Green & Mutala LLP

(57) ABSTRACT

The invention provides an apparatus and method for detecting the location of a gas leak within a test region. The invention comprises an array of calibrated sensors for measuring a plurality of gas concentrations, a control system coupled to the sensor array for calculating and optionally displaying a direction of higher gas concentration, and, an actuator for moving the sensor array under control of the control system, wherein the control system causes the array of sensors to measure the gas concentrations and move in the direction of higher concentration until a stopping condition is achieved. The stopping condition may be achieved when the measured gas concentration exceeds a predetermined threshold or when the concentration otherwise likely corresponds to the leak location based on a comparison with previously measured values.

18 Claims, 5 Drawing Sheets

U.S. PATENT DOCUMENTS

| | | | |
|---|---|---|---|
| 6,157,033 A * | 12/2000 | Chudnovsky | 250/338.5 |
| 6,265,222 B1 | 7/2001 | DiMeo, Jr. et al. | |
| 6,293,137 B1 | 9/2001 | Liu et al. | |
| 6,422,061 B1 | 7/2002 | Sunshine et al. | |
| 6,492,043 B1 | 12/2002 | Knights et al. | |
| 6,519,041 B1 | 2/2003 | Berthold | |
| 6,596,236 B2 | 7/2003 | DiMeo, Jr. et al. | |
| 6,701,772 B2 * | 3/2004 | Kreichauf et al. | 73/23.2 |
| 2003/0024813 A1 | 2/2003 | Taniguchi | |

FOREIGN PATENT DOCUMENTS

| | | |
|---|---|---|
| JP | 07333097 | 12/1995 |
| WO | WO 9846376 | 10/1998 |
| WO | WO 03012387 | 2/2003 |
| WO | WO 2003012387 A2 * | 2/2003 |

* cited by examiner

METHOD AND APPARATUS FOR DETECTING AND LOCATING GAS LEAKS

REFERENCE TO RELATED APPLICATION

This application claims priority from U.S. provisional patent application No. 60/411,786 filed 19 Sep. 2002 entitled "A METHOD FOR DETECTING AND LOCATING HYDROGEN LEAKS IN FUEL CELLS".

TECHNICAL FIELD

The invention relates to the field of gas distribution monitoring and gas leak detection. For example, the invention may be employed to determine the location of a hydrogen gas leak in a fuel cell system or the like.

BACKGROUND

There are many applications where it is important to quickly and reliably detect gas leaks, particularly in systems which use hazardous or flammable gases, such as hydrogen, natural gas, carbon monoxide or the like. In hydrogen fuel cell systems, for example, leaks must be detected quickly to avoid safety hazards. If the concentration of hydrogen in air exceeds about 4% there is a risk of explosion if the hydrogen is ignited.

There exist a variety of prior art systems for detecting leaks of hydrogen and other gases. For example, Bette et al. (U.S. Pat. No. 6,156,447) disclose a method of detecting a gas leak between the anode and cathode areas of a PEM fuel cell wherein the entire cell is initially purged with nitrogen and then the cathode area is filled with oxygen and the anode area is filled with hydrogen. The voltage of the cell is then monitored, which will indicate if there is a leak as the faster the cell voltage drops below a predefined limit the more likely that a leak is present in the cell.

DiMeo, Jr. et al. (U.S. Pat. Nos. 6,265,222 and 6,596,236) disclose thin film solid-state sensor arrays for detecting the presence of hydrogen and other gases.

Berthold (U.S. Pat. No. 6,519,041) discloses a fiber optic hydrogen sensor system comprising a plurality of hydrogen sensors strategically located around a system to be monitored.

There exists a need for a method and apparatus which can both detect a gas leak and determine the location of the leak quickly and efficiently.

SUMMARY OF INVENTION

In accordance with the invention, a method of detecting the location of a gas leak within a test region is provided. The method includes the steps of (a) providing a sensor array comprising a plurality of sensors configured to measure a plurality of gas concentrations; (b) measuring the plurality of gas concentrations; (c) determining a local gas concentration profile based on the measured gas concentrations; (d) moving the sensor array to a new location depending upon the local gas concentration profile determined in step (c); and repeating steps (b) to (d) until a stopping condition is achieved.

Preferably, the local gas concentration profile indicates a direction of higher gas concentration and the step of moving the sensor array to a new location comprises moving the sensor array in the direction of the higher gas concentration. The gas concentration profile may comprise, for example, a gas concentration gradient. The direction of higher gas concentration may be calculated according to a computer algorithm. In one embodiment, determining the local gas concentration profile may comprise comparing the measured gas concentrations at the new location to previously measured gas concentrations at other locations in the test region.

The stopping condition may be achieved when one of the measured gas concentrations exceeds a threshold. In one embodiment, the threshold is predetermined. In other embodiments, the stopping condition may be achieved when the sensor array repeatedly returns to the same location within the test region or when the array measures a plurality of nearly equal high gas concentrations within a localized subregion of the test region.

The method may include the step of, before determining the local gas concentration profile, moving the sensor array within the test region according to a scanning model until a gas concentration exceeding a minimum threshold is detected. The scanning model could, for example, cause the sensor array to scan the test region according to a predetermined or a random scanning sequence.

The method may further optionally include the step of displaying the local gas concentration profile. The method may also include the step of calculating and optionally displaying a global gas concentration profile based on a plurality of the local gas concentration profiles.

The invention also relates to an apparatus for detecting the location of a gas leak within a test region. The apparatus includes a sensor array comprising a plurality of spaced-apart sensors configured to measure a plurality of gas concentrations; a control system operatively coupled to the sensor array for determining a local gas concentration profile based on the measured gas concentrations; and, an actuator controlled by the control system for moving the sensor array toward the highest concentration of the gas within the test region until a stopping condition is achieved.

The control system may optionally include a display for displaying local or global gas concentration profile(s). The control system may also include a microprocessor configured to calculate the gas concentration gradient. The microprocessor may be programmed to cause the actuator to move the sensor array until the measured gas concentrations exceed a predetermined threshold or until the sensor is located proximate the highest gas concentration in the concentration gradient.

The gas sensors may comprise calibrated semiconductor devices. For example, the sensors may comprise MOS capacitors.

In one embodiment, the actuator comprises a three degree of freedom prismatic robot.

BRIEF DESCRIPTION OF DRAWINGS

In drawings which illustrate non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention provides an array of gas sensors coupled to a control system and an actuator. The sensors are sensitive to the gas or gases to be monitored, and provide the control system with a plurality of gas concentration measurements. The control system, which preferably comprises a microprocessor, analyzes the gas concentration measurements and optionally displays the local gas distribution profile. The control system causes the actuator to move the sensor array toward an area of higher concentration until the location of the gas leak is determined.

Figure 1:
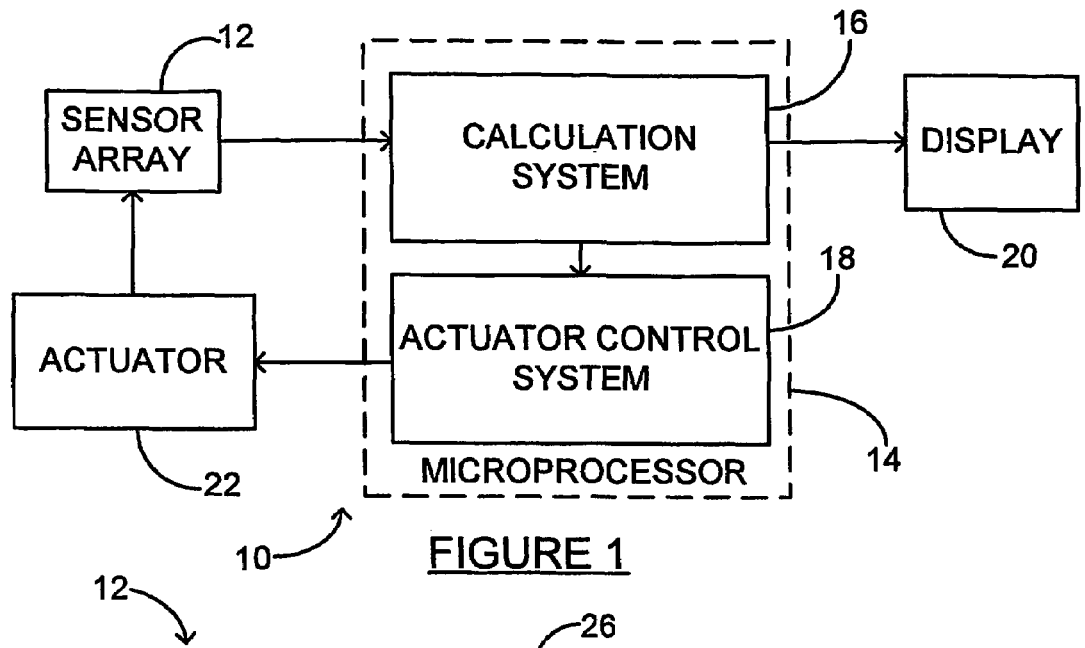
FIG. 1 schematically illustrates a leak detecting and locating system according to one embodiment of the invention.

FIG. 1 shows a leak detecting and locating system 10 according to one embodiment of the invention. System 10 comprises a sensor array 12 which provides signals representing a plurality of gas concentration measurements to a microprocessor 14. A data acquisition circuit, such as a RC circuit (not shown) may be connected between sensor array 12 and microprocessor 14, depending upon the type of sensors used in array 12. Microprocessor 14 comprises a calculation system 16 and an actuator control system 18. Calculation system 16 receives gas concentration measurements from sensor array 12 and calculates a local gas concentration profile for the position within the test region in which sensor array 12 is located. The local gas concentration profile may indicate, for example, a gradient of gas concentrations and a direction of higher gas concentration. Actuator control system 18 receives the gas concentration profile from calculation system 16 and generates an actuator control signal. Optionally, display 20 may also be connected to microprocessor 14 to receive the local gas concentration profile from calculation system 16 and display a visual image of the profile. This would permit an operator to visually monitor the distribution of measured gas concentrations, for example.

Sensor array 12 is coupled to actuator 22, which is electrically connected to receive the actuator control signal from actuator control system 18. Actuator 22 is configured to move sensor array 12 in response to the actuator control signal. Actuator 22 may comprise, for example, a one, two or three dimensional positioning system. In one embodiment, actuator 22 may comprise a three degree of freedom prismatic robot.

Figure 2:
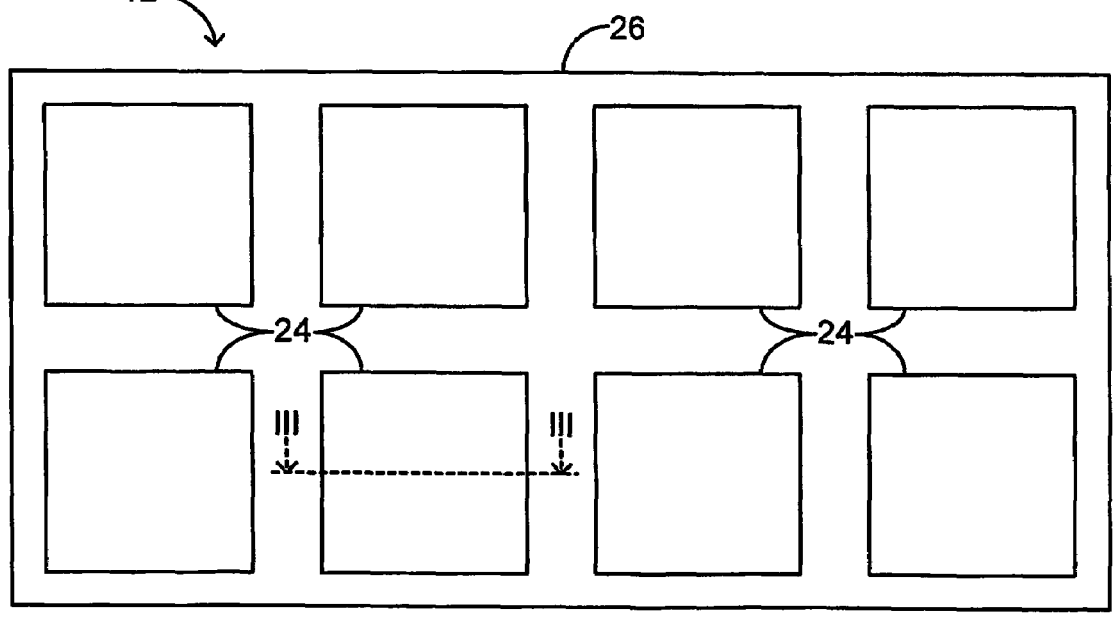
FIG. 2 schematically illustrates the sensor array of the leak detecting and locating system of FIG. 1.

As shown in FIG. 2, sensor array 12 comprises a plurality of spaced-apart individual sensors 24. Sensors 24 are preferably formed on a silicon wafer 26, as described below with reference to FIG. 3. The spacing between sensors 24 may be selected based on the characteristics of the area which system 10 will be used to monitor and the types of leaks expected in the test region. In the illustrated embodiment, array 12 comprises a two by four grid of sensors 24, but it is to be understood that the number and arrangement of sensors 24 in array 12 may be varied without departing from the spirit or scope of the invention. All of the sensors 24 comprising array 12 are calibrated to the same standard.

Figure 3:
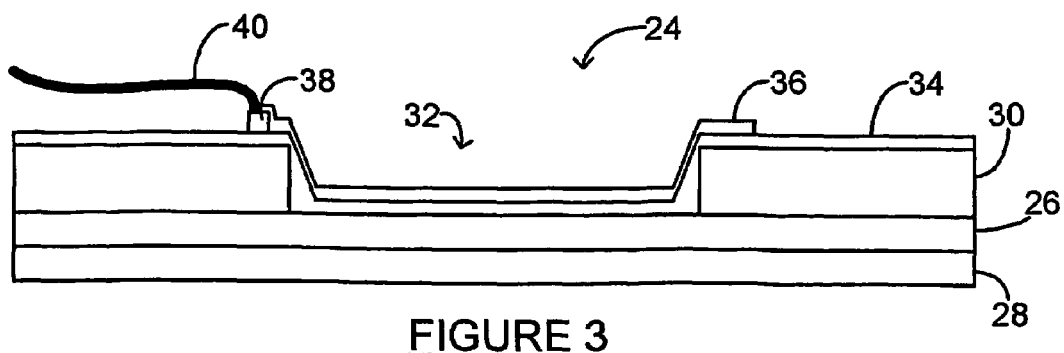
FIG. 3 is a sectional view taken along line III-III of FIG. 2 showing a single sensor of the sensor array.

FIG. 3 is a sectional view of one of the sensors 24 of FIG. 2. In this example, sensors 24 are hydrogen gas sensors and comprise MOS capacitors formed on silicon wafer 26. For monitoring different gases, other types of sensors may be used. Silicon wafer 26 preferably comprises a single crystal silicon substrate, and may be either n-type or p-type. Aluminium layer 28 is deposited on the backside of silicon wafer 26 to act as a common electrode for sensor array 12. Thick silicon oxide layer 30 is deposited on the opposite side of wafer 26 from aluminium layer 28. Thick silicon oxide layer 30 is patterned with mask to leave a space 32 for each sensor 24. Thin silicon oxide layer 34 is deposited atop thick silicon oxide layer 30 and space 32. Palladium layer 36 is deposited atop thin silicon oxide layer 34 in the region of sensor 24. Palladium pad 38 is formed as a thickened portion of layer 36 to provide increased reliability in bonding for a signal output. For example, wire 40 may be coupled to palladium layer 36 and pad 38 to provide a signal to sensor 24. Thin silicon oxide layer 34, palladium layer 36 and silicon wafer 26 make up the MOS capacitor structure. The entire sensor 24 may be fabricated in a conventional CMOS process, such as thermal oxidation, deposition and etching.

When hydrogen gas, for example, is present at the location of sensor 24, some of it is adsorbed into palladium layer 36 and the hydrogen molecules dissociate into hydrogen atoms. The adsorption of hydrogen gas into palladium layer 36 changes the electronic properties of sensors 24 in array 12. For example, the distribution of charges within sensor layers 26, 30 and 34 may give rise to changes in the capacitance of the MOS capacitor. Thus, the output of sensor 12, such as a MOS capacitor, in response to a signal applied by wire 40 is sensitive to the concentration of hydrogen gas at the location of sensor 24, thereby allowing the local gas concentration to be determined by sensor 24 and microprocessor 14.

Figure 4:
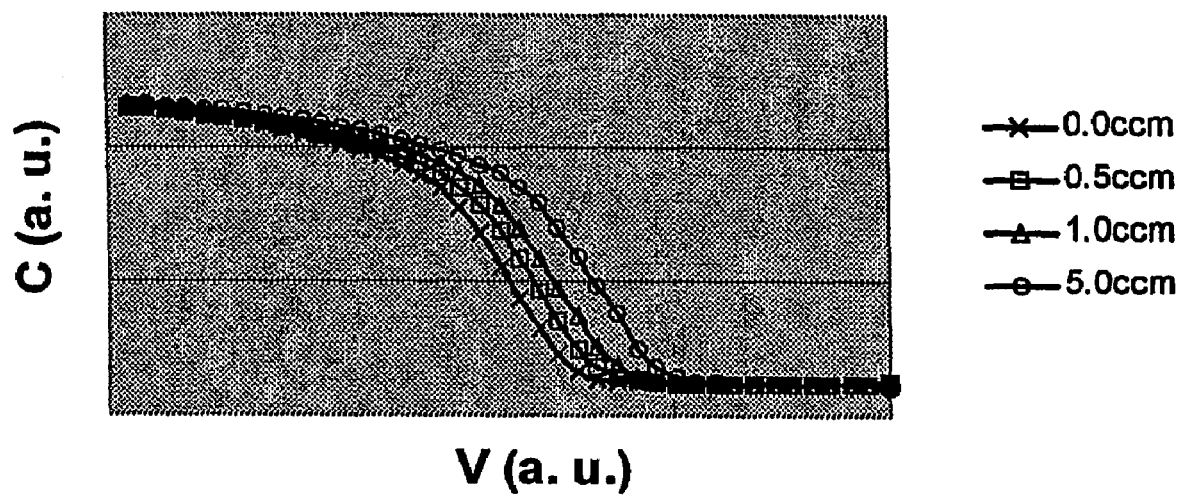
FIG. 4 is a graph showing the capacitive response of a sensor according to a particular embodiment of the invention in the presence of various concentrations of hydrogen gas.

FIG. 4 is a graph showing the capacitive response of an embodiment of sensor 24 comprising a MOS capacitor in the presence of various concentrations of hydrogen gas at different leak rates. The four data lines on the graph of FIG. 5 correspond to, from left to right, leak rates of 0.0, 0.5. 1.0 and 5.0 cubic centimeters per minute (ccm). The current and voltage units are arbitrary (a.u.).

Figure 5:
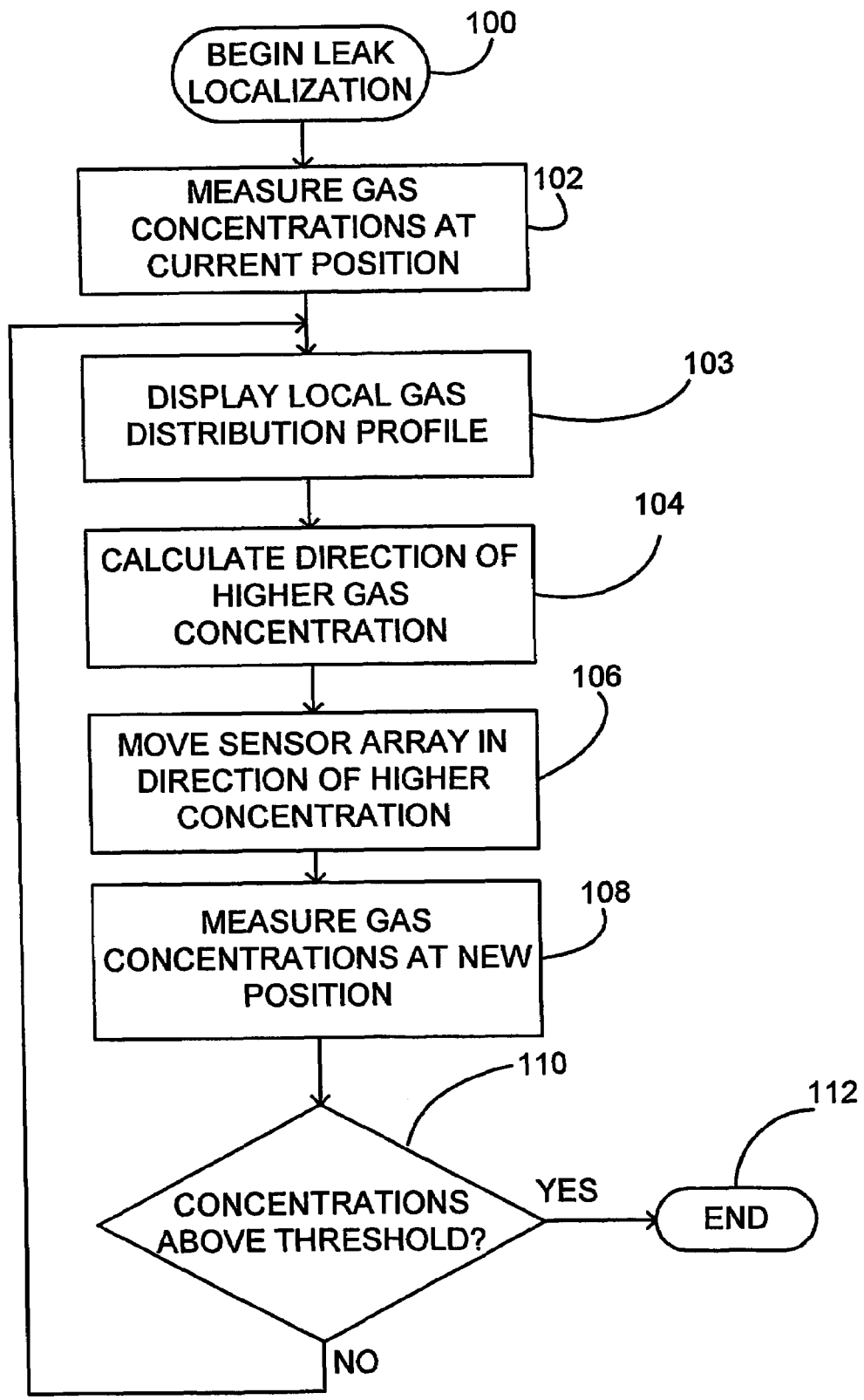
FIG. 5 is a flowchart illustrating a method of locating a leak according to one embodiment of the invention where gas concentration measurements are compared to a predetermined threshold.

FIG. 5 is a flowchart illustrating a method of locating a gas leak according to one embodiment of the invention. Leak localization begins at block 100, and the gas concentrations are measured by sensor array 12 at block 102. The local gas distribution profile comprising the gas concentration measurements may optionally be displayed at block 103. At block 104, microprocessor 14 calculates a direction in which gas concentration is higher, based on the individual gas concentration measurements received from sensors 24. For example, a clear gas concentration gradient may be determined and the direction of higher gas concentration is toward the highest gas concentration in the gradient. At block 106 actuator 22 moves sensor array 12 a predetermined distance in the direction calculated in block 104. The moving range may vary depending upon the specific configuration of actuator 22. For example, array 12 may be displaced a distance equal to the length or width of array 12. In this manner a continuous global gas distribution profile may be determined from a plurality of local measurements stored in memory.

The gas concentrations at the new location of sensor array 12 are measured at block 108 and processed by microprocessor 14. In the example of FIG. 5, the highest local gas concentration measured may be compared to a predetermined set point to determine whether it exceeds a threshold amount as shown at block 110. If the highest local gas concentration is less than the predetermined set point, the process is repeated and actuator 22 moves sensor 12 to a new location. If the local gas concentration exceeds the predetermined set point, the process ends at block 112 and sensor 12 remains at the test location. The predetermined set point may be selected, for example, to correlate with the likely presence of a gas leak or some other parameter, such as a dangerous concentration of the gas to be measured.

Figure 6:
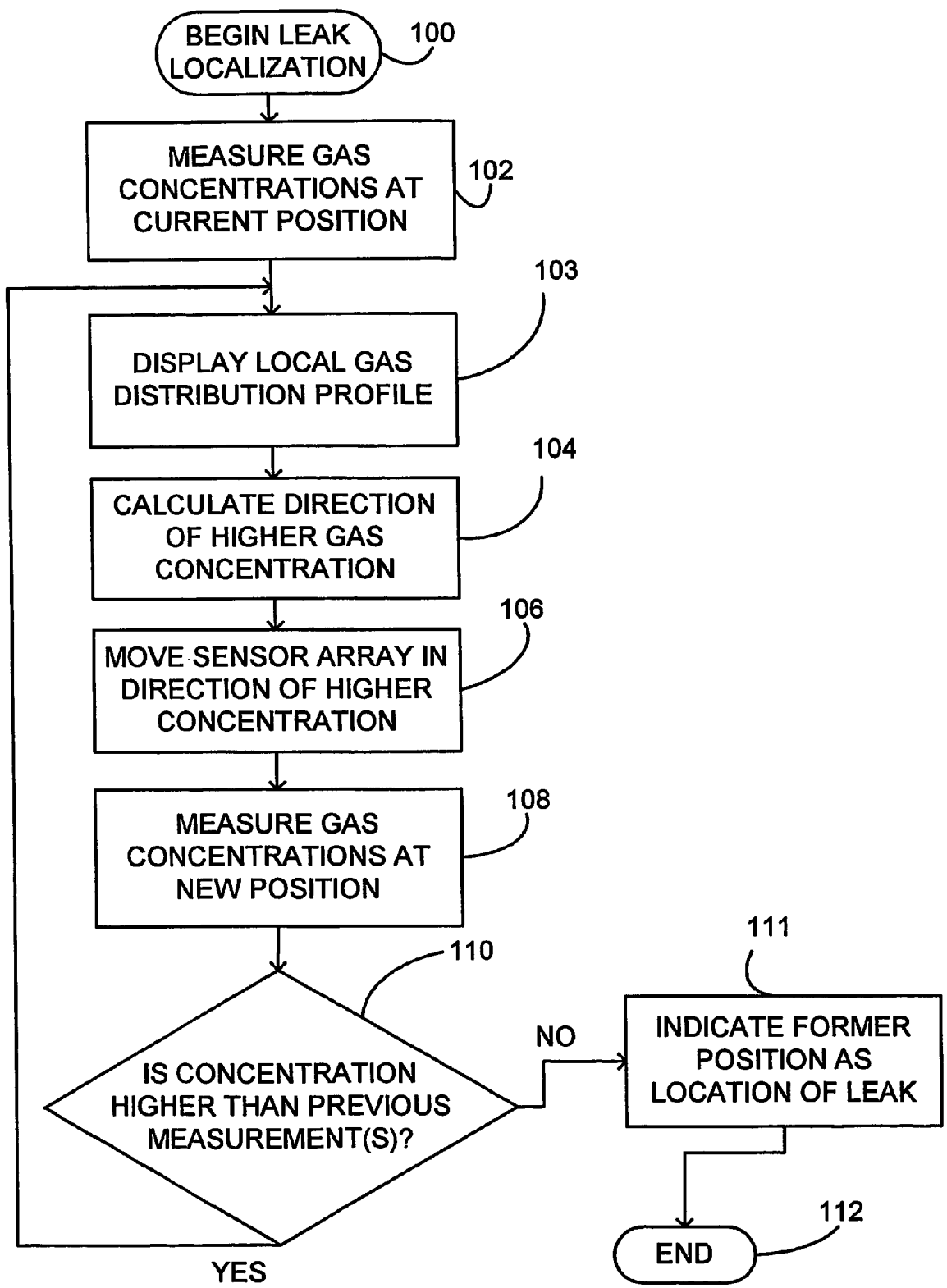
FIG. 6 is a flowchart illustrating a method of locating a leak according to another embodiment of the invention.

FIG. 6 illustrates an alternative embodiment of the invention which does not rely on a comparison to a fixed gas concentration threshold. In this example, the highest local gas concentration measured is compared at block 110 to the gas concentration(s) measured in previous step(s). If the highest local gas concentration is higher than previous measurements, the process is repeated and actuator 22 moves sensor 12 to a new location. If the highest local gas concentration is less than previous measurements, the method continues to block 111 where microprocessor 14 produces an indication that the former location of sensor array 12 is the likely location of the leak, and the method ends at block 112. In the example where there is a clear gradient of gas concentrations within the test region, the process ends when the gradient changes and sensor array 12 begins moving away from the highest detected gas concentration.

As will be appreciated by a person skilled in the art, other stopping criteria for ending the iterative gas concentration measurement process described above may be envisaged. For example, the process could be permitted to continue without repeatedly comparing each new series of local gas concentration measurements with a predetermined fixed set point or previous measurements. In this example, movement of the sensor array 12 could be stopped when it has moved to the same location several times which would be indicative of the leak location. In another example, the actuator might move sensor 12 in a tight orbit of nearly equal elevated gas concentrations which would indicate that the leak is likely at the center of the orbit. In each case, the general principle of the process is to continue to move sensor array 12 to a higher gas concentration position until a stopping condition correlating with the likely leak location is achieved. The stopping conditions may be selected to reflect the fact that, depending upon the gas to be measured and the test environment, the gas distribution may not be stable and the local gas concentration gradients may be changing frequently depending upon the specific locations tested. The leak location would, however, be the location with the highest global gas concentration within the test region.

Figure 7:
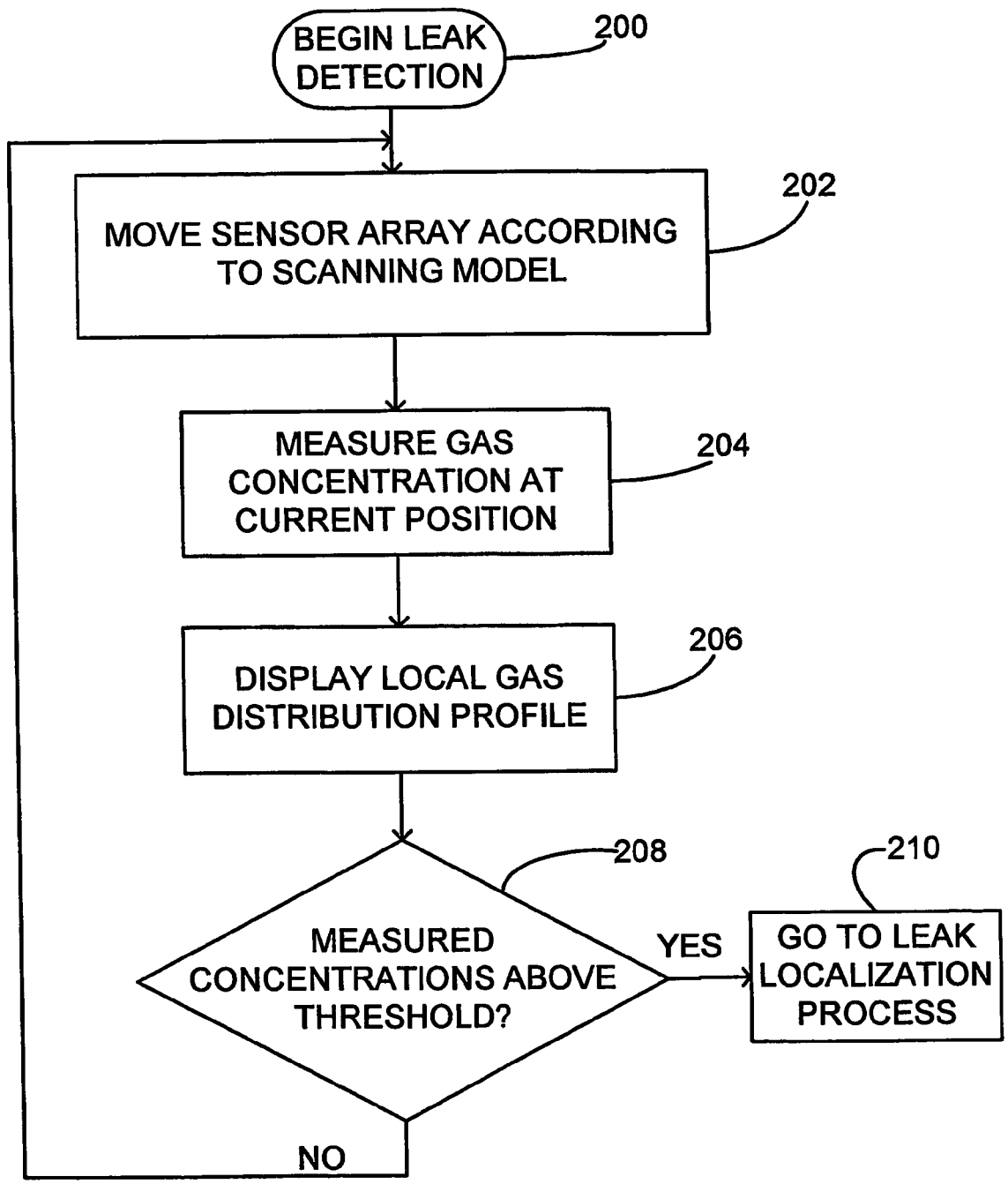
FIG. 7 is a flowchart illustrating a method of detecting the presence of a leak for use in combination with the method of FIG. 5 or 6.

FIG. 7 is a flowchart illustrating a method of detecting the presence of a leak. The method of FIG. 7 may be used to detect the presence of a leak in the test region to be monitored before proceeding with the method of FIG. 6. Leak detection begins at block 200, and at block 202 sensor array 12 is moved to a start position. Movement within the test region may be controlled, for example, by a predetermined scanning model. The scanning model can sweep the test region in one, two or three dimensions, or in random directions, step by step. At every step the local gas concentrations are measured as shown in block 204 and a local gas distribution may be displayed as shown at block 206. At block 208, microprocessor 14 determines if the measured gas concentrations are higher than a threshold, such as a set point indicative of a likely gas leak. The scanning continues if the gas concentrations measured are lower than the set point threshold (i.e. no gas leak is detected). If any gas concentration measured is higher than the threshold, the method continues to block 210, where the leak localization method described above is initiated at block 100 of FIG. 6.

As will be appreciated by a person skilled in the art, the scanning method of FIG. 7 can be used to generate a global gas distribution profile which may be useful in many gas monitoring applications in addition to leak location. For example, such a profile could be used to show the gas concentration within or around a pipeline or other conduit. The present invention yields more complete and accurate gas concentration measurement in a more economical manner than conventional systems which rely on multiple, fixed location sensors.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of detecting a location of a gas leak within a test region, the method comprising:
   (a) providing a sensor array comprising a plurality of sensors configured to measure a plurality of gas concentrations simultaneously;
   (b) measuring the plurality of gas concentrations at the same time, while maintaining a position of the sensor array;
   (c) determining a local gas concentration profile based on the measured gas concentrations;
   (d) moving the sensor array to a new location depending upon the local gas concentration profile determined in step (c); and,
   (e) repeating steps (b) to (d) until a stopping condition is achieved whereby the location of the gas leak is indicated by the location of the sensor array,
   wherein determining the local gas concentration profile comprises calculating a gas concentration gradient.

2. The method as defined in claim 1, wherein the local gas concentration profile indicates a direction of higher gas concentration.

3. The method of claim 2, wherein moving the sensor array to a new location comprises moving the sensor array in the direction of the higher gas concentration.

4. The method of claim 1, wherein the stopping condition is achieved when one of the measured gas concentrations exceeds a threshold.

5. The method of claim 4, wherein the threshold is predetermined.

6. The method of claim 1, comprising, before determining the local gas concentration profile, moving the sensor array within the test region according to a scanning model until the measured gas concentrations exceed a minimum threshold.

7. The method of claim 1, wherein the stopping condition is achieved when the sensor array measures a plurality of nearly equal high gas concentrations within a localized sub-region of the test region.

8. The method of claim 1, further comprising displaying the local gas concentration profile.

9. A method of detecting a location of a gas leak within a test region, the method comprising:
   (a) providing a sensor array comprising a plurality of sensors configured to measure a plurality of gas concentrations simultaneously;
   (b) measuring the plurality of gas concentrations at the same time, while maintaining a position of the sensor array;
   (c) determining a local gas concentration profile based on the measured gas concentrations;

(d) moving the sensor array to a new location depending upon the local gas concentration profile determined in step (c); and, (e) repeating steps (b) to (d) until a stopping condition is achieved whereby the location of the gas leak is indicated by the location of the sensor array, wherein determining a local gas concentration profile comprises comparing the measured gas concentrations to previously measured gas concentrations at other locations in the test region.

10. A method of detecting a location of a gas leak within a test region, the method comprising:

(a) providing a sensor array comprising a plurality of sensors configured to measure a plurality of gas concentrations;

(b) measuring the plurality of gas concentrations;

(c) determining a local gas concentration profile based on the measured gas concentrations;

(d) moving the sensor array to a new location depending upon the local gas concentration profile determined in step (c); and, (e) repeating steps (b) to (d) until a stopping condition is achieved whereby the location of the gas leak is indicated by the location of the sensor array, wherein the stopping condition is achieved when the sensor array repeatedly returns to the same location within the test region.

11. A method of detecting a location of a gas leak within a test region, the method comprising:

(a) providing a sensor array comprising a plurality of sensors configured to measure a plurality of gas concentrations;

(b) measuring the plurality of gas concentrations;

(c) determining a local gas concentration profile based on the measured gas concentrations;

(d) moving the sensor array to a new location depending upon the local gas concentration profile determined in step (c); and, (e) repeating steps (b) to (d) until a stopping condition is achieved whereby the location of the gas leak is indicated by the location of the sensor array, wherein the test region is a fuel cell.

12. Apparatus for detecting a location of a gas leak within a test region, the apparatus comprising:

(a) a sensor array comprising a plurality of spaced-apart sensors configured to measure a plurality of gas concentrations;

(b) a control system operatively coupled to the sensor array for determining a local gas concentration profile based on the measured gas concentrations; and, (c) an actuator controlled by the control system for moving the sensor array toward the highest concentration of the gas within the test region until a stopping condition is achieved whereby the location of the gas leak is indicated by the location of the sensor array, wherein the control system comprises a microprocessor configured to calculate a gas concentration gradient.

13. The apparatus of claim 12 wherein the sensors comprise calibrated semiconductor sensors.

14. The apparatus of claim 13, wherein the sensors comprise MOS capacitors.

15. The apparatus of claim 12, wherein the actuator comprises a sensor positioning system movable in one, two or three dimensions within the test region.

16. The apparatus of claim 12 wherein the sensor array is configured to measure the plurality of gas concentrations simultaneously.

17. The apparatus of claim 12 wherein the control system is configured to analyze the gas concentration gradient to determine a direction for moving the sensor array with the actuator.

18. Apparatus for detecting a location of a gas leak within a test region, the apparatus comprising:

(a) a sensor array comprising a plurality of spaced-apart sensors configured to measure a plurality of gas concentrations simultaneously;

(b) a control system operatively coupled to the sensor array for determining a local gas concentration profile based on the simultaneously measured gas concentrations; and, (c) an actuator controlled by the control system for moving the sensor array toward the highest concentration of the gas within the test region until a stopping condition is achieved whereby the location of the gas leak is indicated by the location of the sensor array, wherein the control system comprises a microprocessor, and wherein the microprocessor is configured to calculate a gas concentration gradient.

\* \* \* \* \*